United States Patent [19]
Kirby

[11] 3,744,020
[45] July 3, 1973

[54] MARINE SEISMIC SOURCE
[75] Inventor: Robert A. Kirby, Houston, Tex.
[73] Assignee: Esso Production Research Company, Houston, Tex.
[22] Filed: Sept. 22, 1971
[21] Appl. No.: 182,797

[52] U.S. Cl............................ 340/12 SD, 181/5 NC
[51] Int. Cl. ............................................. H04b 13/00
[58] Field of Search..................... 340/12 SD, 8 FT, 340/8, 12; 181/5 R, 5 AG, 5 J, 5 XC, 5 NC

[56] References Cited
UNITED STATES PATENTS
3,444,953   5/1969   Cholet et al. ........................ 181/0.5
2,978,669   4/1961   Harris ........................... 340/12 R X
3,480,101   11/1969  Barry et al. ......................... 340/7 R

*Primary Examiner*—Samuel Feinberg
*Assistant Examiner*—Harold Tudor
*Attorney*—James A. Reilly, John B. Davidson et al.

[57] ABSTRACT

A marine seismic source is described including an enclosure for containing a large quantity of gas. Disposed beneath the enclosure are one or more controlled seismic sources, preferably of the type wherein an explosive gaseous mixture is detonated within an expansible enclosure. Means are provided for the purpose of towing the source at a determinable depth from a vessel, and for stabilizing the apparatus during towing operations.

7 Claims, 4 Drawing Figures

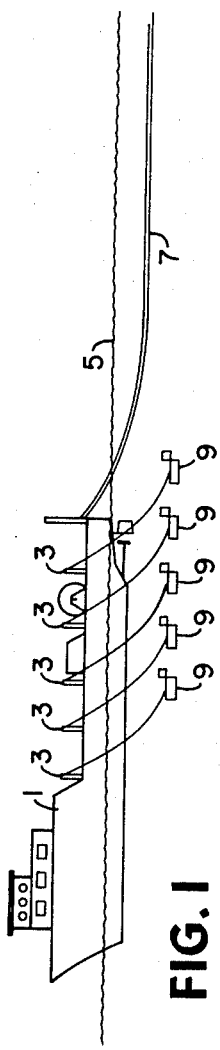
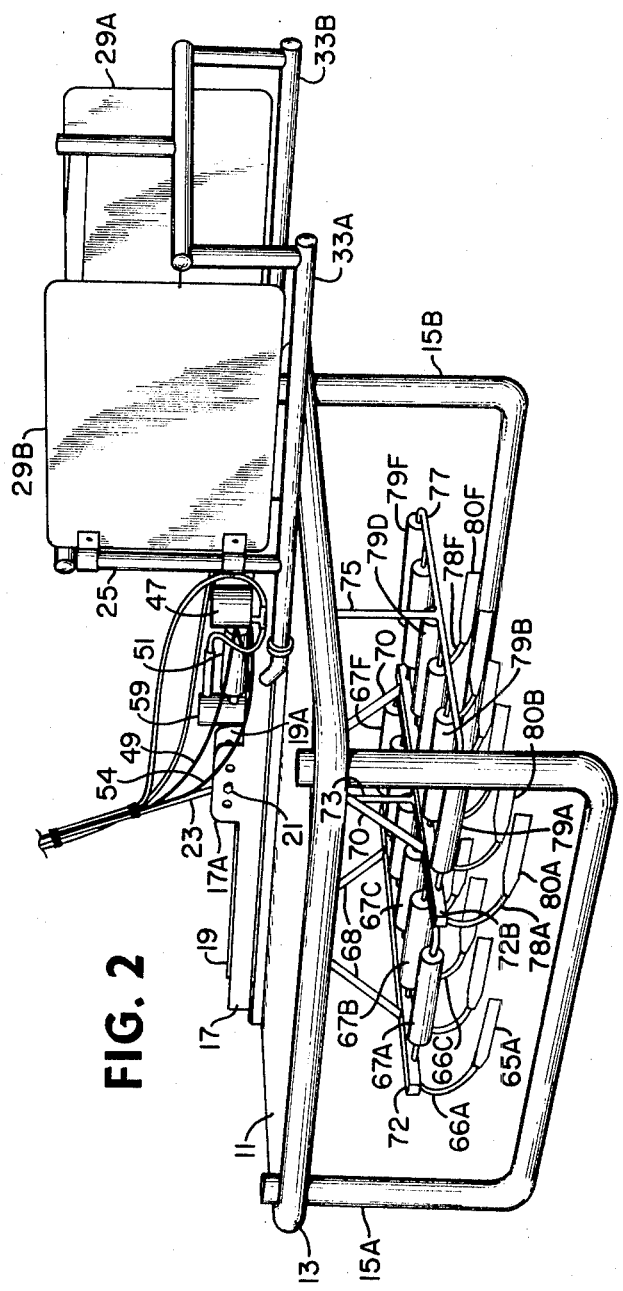

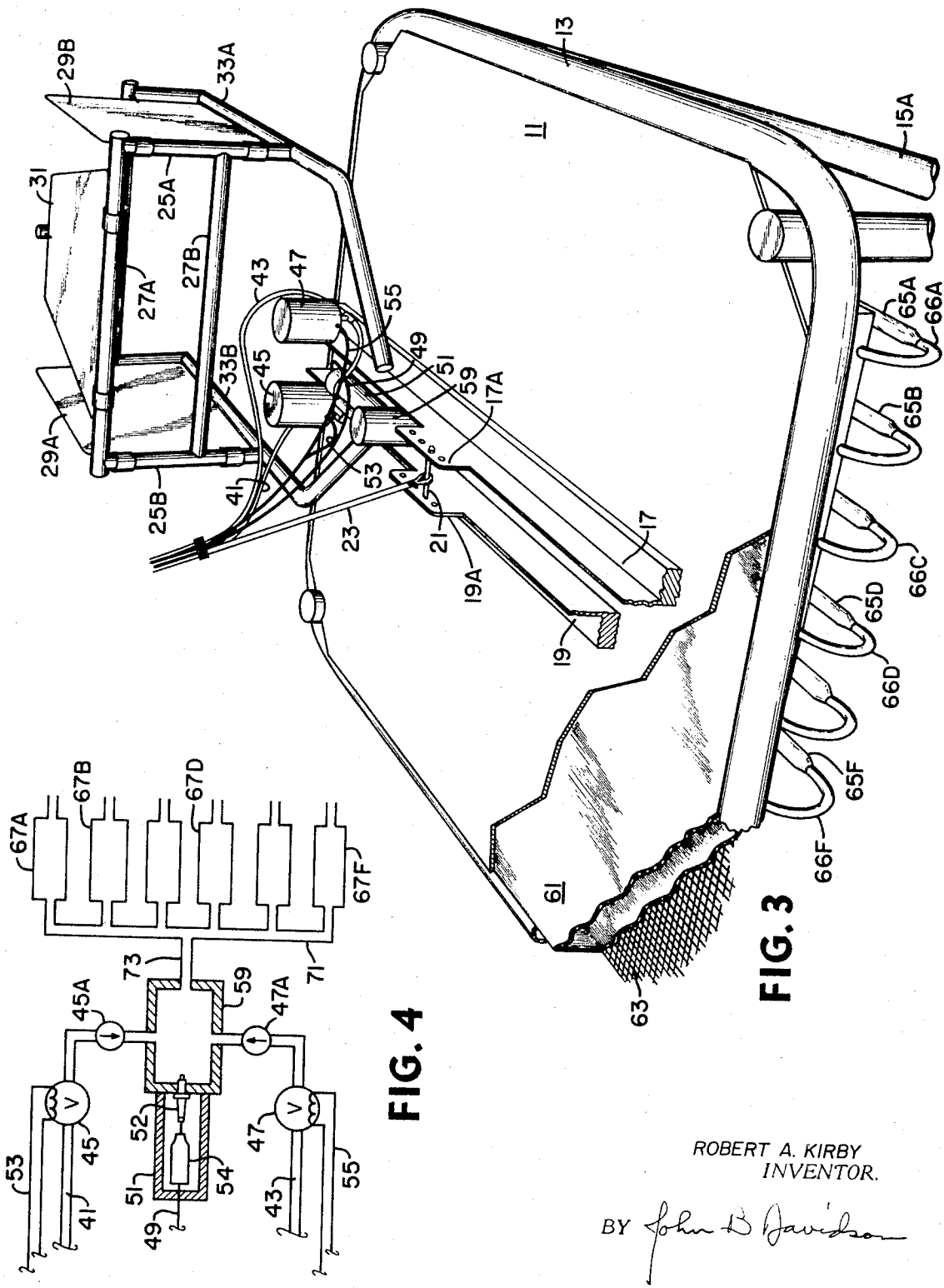
ROBERT A. KIRBY
INVENTOR.
BY John D Davidson
ATTORNEY 3,744,020

MARINE SEISMIC SOURCE

BACKGROUND OF THE INVENTION

This invention relates to marine seismic sources and particularly to high frequency nondynamite marine seismic sources adapted to be towed from a vessel.

Since about 1956, a number of nondynamite marine seismic sources for use in connection with geophysical exploration have become available to industry. A particularly successful marine seismic source is described in U.S. Pat. No. 3,480,101. This type of source makes use of an expansible enclosure, such as an elastomer affixed to a supporting structure, and a plurality of passageways for cooling the products of combustion within the expansible chamber and the supporting structure. A combustible gas such as propane and oxygen is introduced into the expansible enclosure and ignited to produce seismic energy by the sudden expansion of the enclosure. The seismic pulse produced by this source is very clean, with a minimum of afterpulses, commonly termed "bubble pulses." This type of seismic source is known as a "sleeve exploder."

It has been proposed to use sleeve exploder type sources of reduced size to generate high frequency seismic energy where the individual sleeve exploder sources are positioned near the water surface a distance below the air-water interface substantially equal to one-quarter wave length in water of seismic energy having a frequency in the desired frequency spectrum of energy to be produced by the seismic source. In areas where it is desirable to utilize high frequency seismic energy, apparatus of this nature have been found to be effective. A difficulty with high frequency seismic sources is that higher frequency energy (i.e., 100 Hz or above) is not as compatible with the earth as lower frequency energy and is much more rapidly attenuated as it passes through the earth. Therefore, it is desirable to have the seismic sources produce as much energy as possible.

SUMMARY OF THE INVENTION

In accordance with the present invention, there is provided an enclosure for a large volume of a gas, such as air, having relatively low density and in which the velocity of seismic energy propagation is of the order of 1,000 to 1,300 ft/sec. Means affixed to the enclosure permit the enclosure to be submerged in the water and towed in a substantially horizontal manner at a desired depth. Below the enclosure there are positioned a multiplicity of seismic sources, preferably of the sleeve exploder type. The length of the sleeve exploders preferably is such that each exploder resembles a point source of energy. Thus, the time for combustion to take place throughout a sleeve should be small in relation to the cycle lengths of the desired energy in the seismic impulse. It is also important that the spacing of the gas enclosure above each sleeve be such that the desired wave shape of the pulse is not unduly sharpened or broadened. In general, the spacing should be about one-quarter wave length in water of seismic energy having a desired frequency in the frequency spectrum of energy to be produced by the seismic source. Increasing variations from this value tend to increasingly degenerate the wave shape of the energy.

Objects and features of the invention not apparent from the above discussion will become evident upon consideration of the following detailed disclosure of the invention taken in connection with the accompanying drawings.

DESCRIPTION OF THE DRAWINGS

FIG. 1 is a view of a seismic exploration vessel positioned in an aqueous medium towing a plurality of seismic sources constructed in accordance with the invention.

FIG. 2 is a perspective view of the invention, particularly illustrating the relative position of the seismic sources to the supporting structure therefor.

FIG. 3 is another perspective view of the source of FIG. 2, partially cut away and partially sectioned so as to more effectively illustrate the constructional features of the invention.

FIG. 4 is a schematic diagram illustrating gas and electrical control equipment for use with the apparatus of FIGS. 1 and 2.

DESCRIPTION OF THE PREFERRED EMBODIMENT

With reference now to FIG. 1 there is illustrated a seismic exploration vessel 1 in a body of water 5 towing a conventional seismic detector cable 7 and a plurality of seismic sources 9 constructed in accordance with the invention. Each seismic source is towed from a davit 3 and preferably is towed at substantially the same depth in the water so as to avoid undue broadening or narrowing of the seismic pulse - i.e., to optimize the composite pulse shape.

With reference now to FIGS. 2 and 3 taken together, there is illustrated one of the seismic sources 9 which is seen to comprise a large, substantially rectangular plate 11 which is affixed to the upper portion of a large diameter pipe 13 or rubber bumper formed so as to conform to the outer surface of the rectangle. Openings at the corner of the plate 11 are provided so that substantially U-shaped runners 15A and 15B can protrude therethrough. The runners are also welded to the plate 11. The function of the runners will become apparent below. Extending from one edge to the other of the member 13 and welded to plate 11 are a pair of L-beams 17 and 19 which have flanges 17A and 19A extending upwardly therefrom. As seen in FIG. 3, the flanges 17A and 19A have a plurality of small holes drilled therethrough for receiving a pin or bolt 21 to which is affixed a tow cable 23. The reason for the plurality of holes in the flanges 17A and 19A is to permit a certain amount of adjustment to the position of the two cable so that the structure may have as much stability as possible under tow.

Welded to the L-beams 17 and 19 are pipes 33A and 33B which together with pipe 25A and 25B provide a supporting structure for a pair of rudders 29A and 29B extending upwardly and to the rear of the metal plate 11. The horizontal bar 27A extending between the bars 25A and 25B is provided for the purpose of supporting a stabilizer 31.

A wire mesh 63 is affixed to the lower edge of the tubular pipe or bumper member 13 as by welding or by straps. Within the enclosure or zone defined by the mesh, the tubular pipe member 13, and the generally rectangular plate member 11 there is provided an inflatable, gas-tight enclosure or bag 61 which, when inflated with a gas, is adapted to occupy substantially the entirety of the space between the wire mesh 63 and the plate member 11. More than one bag may be used if desirable. The bag or bags may be constructed of natural rubber, neoprene, or other durable gas-tight material. A valve member, preferably a check valve, is provided for the purpose of inflating the bag 61 with gas. The gas used may be any convenient nonexplosive gas such as air, helium, or other gas of low density. The wire mesh 63 functions to retain the bag 61 in place within said enclosure or zone and to permit seismic energy from sources 67A, 67B . . . 67F and 79A, 79B . . . 79F (described below) to impinge directly on the bag 61. Other suitable retaining means may be used.

Suspended below the wire mesh as by girders 68 and 70 which may be affixed to the plate 11 at the upper end thereof are two sets of sleeve exploder type seismic wave sources designated by reference numerals 67A, 67B . . . 67F, and 79A, 79B . . . 79F. The design of the seismic wave sources may be as illustrated in U.S. Pat. No. 3,480,101. If the sources are of the type described in U.S. Pat. No. 3,480,101, they should be modified so that products of combustion are removed from the combustion chamber from the end thereof opposite to that into which explosive gases are introduced.

The seismic sources 67A, 67B . . . 67F are supported at one end by a horizontal suspension bar 72 which may be supported by a girder (not shown) extending between opposed sides of pipe or bumper 13, and at the other end by a header pipe 71 which in turn is connected to a supply pipe 73 for explosive gases which is tied into ignition chamber 59. Similarly, the seismic sources 79A, 79B . . . 79F are supported between members 72 and 72B which in turn is supported by struts 70 tied to the horizontal girder (not shown) mentioned above. The other end of these sources is conneted to a header 77 which is supported by vertical pipe 75 which also leads to the ignition chamber 59.

As illustrated in FIGS. 3 and 4, oxygen and a combustible gas such as propane are drawn from the vessel 1 through conduits 41 and 43, respectively. The gases, which are under pressure, are controlled by electromagnetically actuated valves 45 (in line 41) and 47 (in line 43). Electrical leads 53 and 55 respectively control valves 45 and 47. Check valves 45A and 47A are used in conjunction with electromagnetically actuated valves 45 and 47 to insure that there will be no backfiring of gases up the lines 41 and 43 upon detonation thereof. The gases are conducted to a mixing chamber 59 and the seismic sources 66A, 66B . . . 66F. The gases are ignited by a spark plug 52. Energy for activating the spark plug 52 is derived from a conventional spark coil 54, which is actually a pulse transformer, electrical energy for which is derived from line 49 leading to the vessel 1.

Gases from the seismic sources 67A, 67B . . . 67F are purged therefrom through line 66A, 66B . . . 66F which are controlled by duck-bill type valves 65A, 65B and 65C which may be of the type described in U.S. Pat. No. 3,444,953. Briefly described, the duck-bill valves permit exit of gases from the seismic sources when the pressure therein exceeds the ambient water pressure so that the lips of the valve are forced apart permitting gases to escape. However, when the pressure exterior of the valve is greater than the pressure within the valve, the lips of the rubber portion of the valves are compressed together to prevent entry of liquid thereinto. Similarly, duck-bill valves 80A, 80B . . . 80F control the exit of fluid from sources 79A, 79B . . . 79F.

As indicated above, the various seismic sources, 65A, 65B . . . 65F and 79A, 79B . . . 79F are positioned below the lower surface of the air bag 61, preferably by a distance approximately one-quarter wavelength in water of seismic waves having a frequency equal to the frequency of waves in the desired frequency spectrum to be produced by the source.

The tow cable 23 should be sufficiently long that the source will be towed through the water off to the side of the vessel at the desired depth. A significant feature of the invention is that the operating depths of the source can be varied considerably. In general, the operating depth of the sleeve exploder sources is limited only by the available pressure of the combustible gas and of the oxygen. The rudders 29A and 29B and the stabilizer 31 should be adjusted so as to maintain optimum cable tension and so that the source will remain substantially horizontal and will give the most desirable towing characteristics insofar as stability, ability to follow a track parallel to the track of the ship, etc. are concerned.

When it is desirable to actuate the source described above, valves 45 and 47 are opened to permit gases to enter the mixing chamber 59, and after being mixed therein, to pass through lines 73 and 75 and headers 71 and 77 into the guns. After gases previously therein have been purged therefrom, an electrical pulse on line 49 will produce a spark discharge across the spark plug electrodes to ignite the gas in the mixing chamber. The flame front will proceed down the pipes 73 and 75 and the header 71 and 77 into the seismic sources to detonate the gases therein and produce a very large amplitude seismic pulse. The gases will not be immediately purged through the duck-bill valves but will cause the elastomer sleeve to expand to a large diameter to produce seismic energy. As the gases cool and the pressure on the combustion chamber decreases, the elastomer will contract. The duck-bill valves will open to permit gases to be discharged therethrough from the seismic sources. But, during production of the seismic pulse, only a portion of the products of combustion will be expelled from the sources. The amount of combustion products so expelled will be determined by the rapidity with which they cool after detonation. The valves 45 and 47 are again opened to introduce fresh ignitable gases into the seismic source. the duck-bill valves will open to permit purging of the sources of the remainder of the products of combustion preparatory to production of another seismic pulse.

As is well known, the seismic energy produced by the seismic sources will be propagated in all directions from the sources. Energy propagated upwardly will strike the lower surface of the gas bag 61 and will be reflected downwardly with a change in the polarity or sign thereof. The efficiency of the reflection phenomenon generally increases with increasing differences between the acoustic impedances of the bag of gas and of the water or other liquid medium in which the source is operating. It is a feature of this invention that the reflection coefficient is negative in value and preferably approaching the value of one.

The plurality of sources illustrated in FIG. 1 may easily be simultaneously actuated from a common electrical source. The reason for using a plurality of sources is simply to build up the amplitude of the seismic energy produced thereby.

By using sources in the manner described above, it will be found possible to obtain seismic reflections from reflecting horizons at depths of 7,000 to 10,000 feet in the earth, the reflections having energy of 100 cycles or more. As a result, the reflecting horizons can be much better delineated and further, very thin beds can be detected at depths up to 7,000 to 10,000 feet where they never have been able to be detected before using prior art seismic sources.

What is claimed is:

1. In marine seismic energy generating apparatus for use in a liquid medium including at least one source of seismic energy, the improvement comprising:

a reflector of seismic energy positioned above said at least one source to reflect energy therefrom, said reflector including enclosure means for confining gas of sufficient volume to produce large seismic velocity change for seismic energy entering thereinto from surrounding liquid.

2. The apparatus of claim 1 wherein the gas transmits seismic energy at a velocity of less than 1,300 feet per second.

3. The apparatus of claim 1, wherein said reflector of seismic energy further includes a large metal plate, means connected to said plate for retaining said inflatable chamber immediately below said plate, and means connected to said plate for receiving a tow line, and means connected to said plate for maintaining said plate in a substantially horizontal position as said seismic reflector is towed through the water.

4. In a marine seismic energy generating apparatus for use in a liquid medium including a source of seismic energy adapted to be actuated in said medium, the improvement comprising:

a reflector of seismic energy positioned above said source to reflect energy therefrom, said reflector including enclosure means for confining gas of sufficient volume to produce a negative reflection coefficient for seismic energy entering thereinto from said liquid medium.

5. An apparatus as defined in claim 1 in which said reflector is spaced from said source a distance about one-quarter wave length in said medium of seismic energy having a desired frequency in the frequency spectrum of seismic energy produced by said source of seismic energy.

6. Apparatus for generating seismic energy within a body of water which comprises a seismic energy source for operation submerged in said body of water to emit seismic energy having a preselected frequency spectrum, and seismic energy reflector means positioned above, said seismic energy source to reflect seismic energy emitted from said seismic energy source, said seismic energy reflector means containing a quantity of gas sufficient to provide said reflector means with an acoustic impedance such that the reflection coefficient presented to seismic energy hitting said reflector means from said source when said apparatus is submerged in said body of water is negative.

7. An apparatus as defined in claim 3 wherein said source emits a pulse of seismic energy of a duration which is small in relation to the cycle length in water of seismic energy in said pulse having a desired frequency.

* * * * *